US009497066B2

(12) United States Patent
Kikuchi et al.

(10) Patent No.: US 9,497,066 B2
(45) Date of Patent: Nov. 15, 2016

(54) INFORMATION PROCESSING APPARATUS, METHOD FOR CONTROLLING THE SAME, AND STORAGE MEDIUM

(71) Applicant: CANON KABUSHIKI KAISHA, Tokyo (JP)

(72) Inventors: Tomoaki Kikuchi, Ayase (JP); Yuichi Kinoshita, Tama (JP)

(73) Assignee: Canon Kabushiki Kaisha, Tokyo (JP)

( * ) Notice: Subject to any disclaimer, the term of this patent is extended or adjusted under 35 U.S.C. 154(b) by 251 days.

(21) Appl. No.: 14/024,265

(22) Filed: Sep. 11, 2013

(65) Prior Publication Data

US 2014/0082207 A1 Mar. 20, 2014

(30) Foreign Application Priority Data

Sep. 14, 2012 (JP) .................. 2012-203020

(51) Int. Cl.
*G06F 15/16* (2006.01)
*H04L 29/08* (2006.01)
*H04L 29/12* (2006.01)

(52) U.S. Cl.
CPC ......... *H04L 29/08576* (2013.01); *H04L 67/14* (2013.01); *H04L 61/3065* (2013.01)

(58) Field of Classification Search
CPC ............... H04L 67/14; H04L 61/3065; H04L 29/08576
See application file for complete search history.

(56) References Cited

U.S. PATENT DOCUMENTS

| 2012/0052874 | A1* | 3/2012 | Kumar | G01C 21/20 455/456.1 |
| 2012/0106445 | A1* | 5/2012 | Horn | H04W 8/26 370/328 |
| 2013/0019298 | A1* | 1/2013 | Jover Segura | H04L 63/101 726/7 |
| 2013/0177001 | A1* | 7/2013 | Abraham | H04W 28/06 370/338 |
| 2013/0235859 | A1* | 9/2013 | Sun | H04W 48/08 370/338 |
| 2014/0068778 | A1* | 3/2014 | Bhatia | H04W 4/02 726/26 |
| 2015/0130614 | A1* | 5/2015 | Liu | G08B 25/10 340/541 |

FOREIGN PATENT DOCUMENTS

GB  EP 2372971 A1 * 10/2011 ........... H04L 63/101
JP  2007-166577 A  6/2007

* cited by examiner

*Primary Examiner* — Jonathan Bui
(74) *Attorney, Agent, or Firm* — Canon USA Inc., IP Division

(57) ABSTRACT

A communication apparatus receives a network ID from an access point, connects to a network formed by the access point, establishes communication with an external device via the connected network, allows data communication, receives a device ID from the external device, compares the network ID of the connected network with the received device ID, and determines whether the external device is operating as the access point based on a result of the comparison.

16 Claims, 17 Drawing Sheets

INFRASTRUCTURE MODE

CAMERA ACCESS POINT MODE

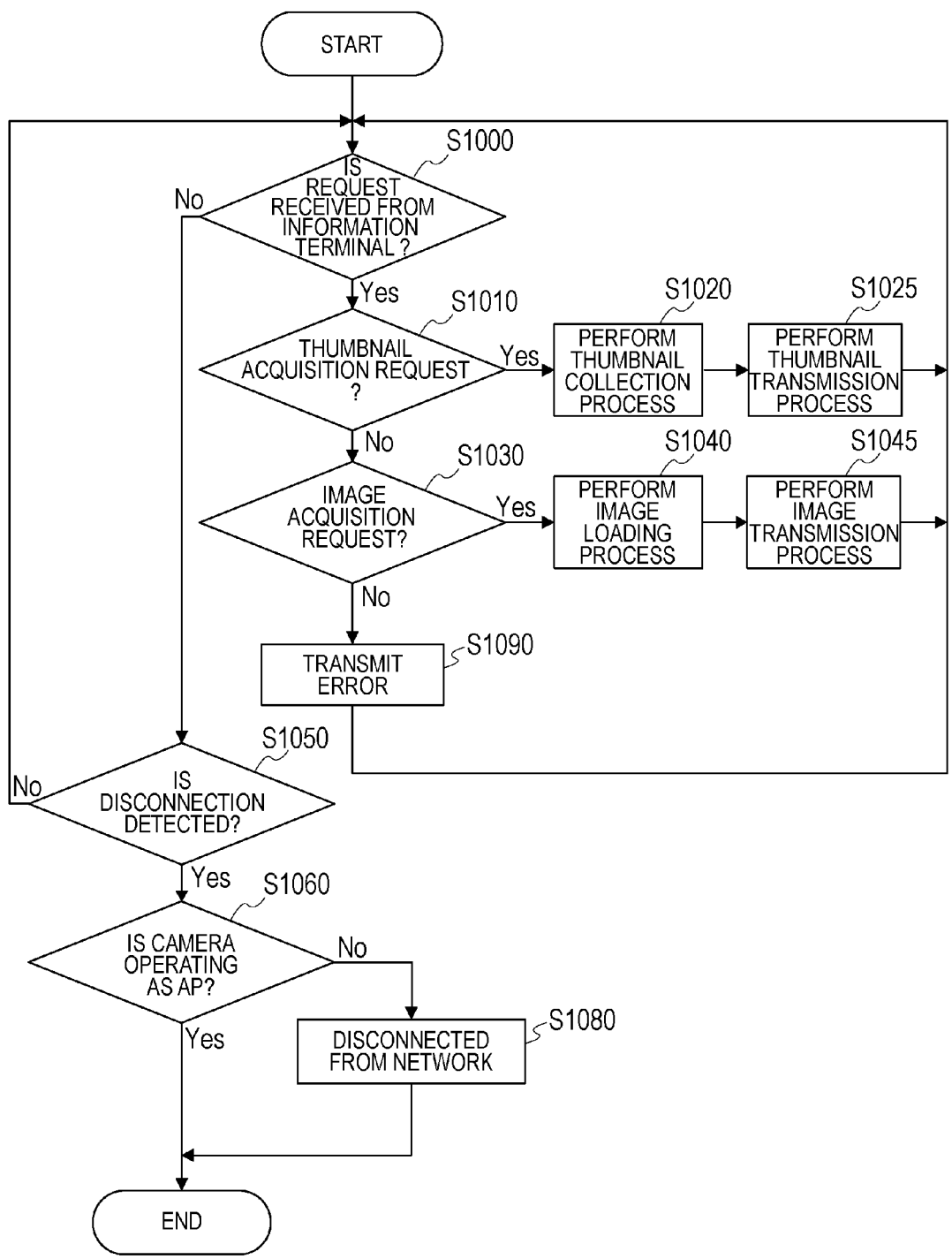

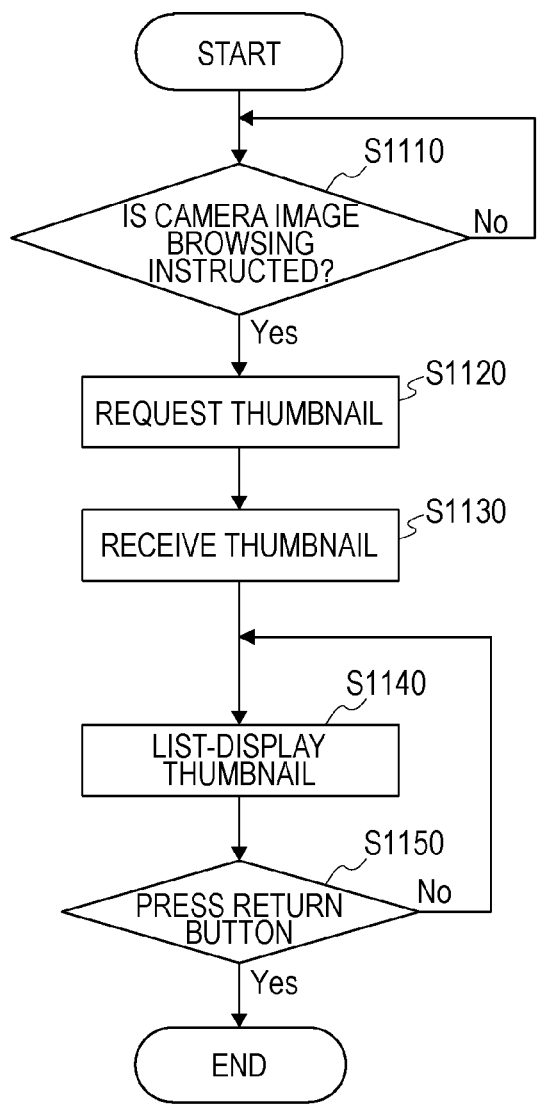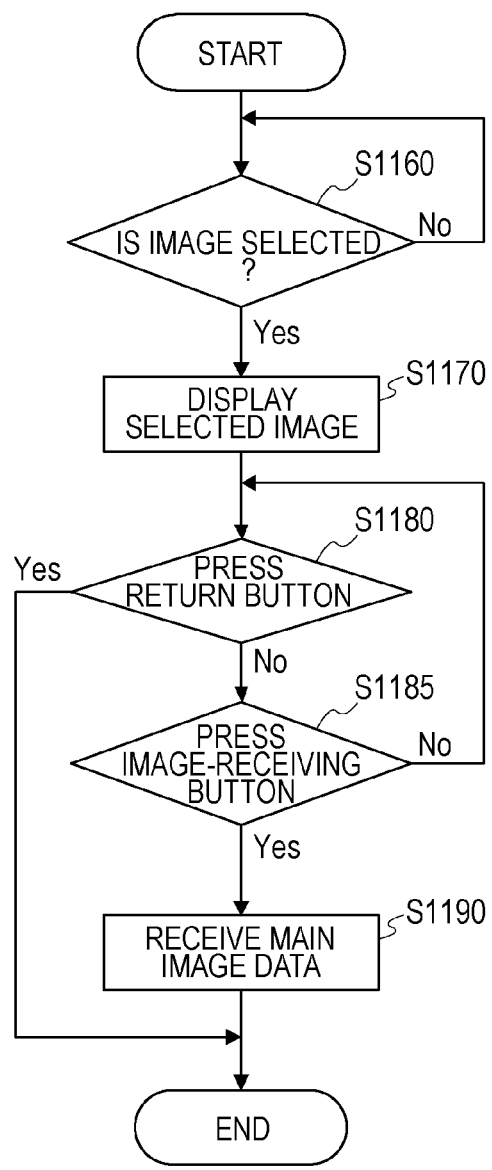

INFORMATION PROCESSING APPARATUS, METHOD FOR CONTROLLING THE SAME, AND STORAGE MEDIUM

BACKGROUND

Field

Aspects of the present invention generally relate to a technology for communicating with another apparatus via a network.

Description of the Related Art

As described in Japanese Patent Application Laid-Open No. 2007-166577, a technology is known in which a data processing apparatus, such as a digital camera, is equipped with a wireless communication function and transmits image data stored in the data processing apparatus to an external apparatus. Use of this function allows easier transmission of the image data to the external apparatus.

In recent years, a digital camera equipped with a simple access point (for example a micro access point) function has also been known. When the digital camera starts up the simple access point function, another apparatus senses the digital camera as an access point and participates in a network formed by the digital camera. This configuration allows easy communication between the digital camera and another apparatus.

SUMMARY

A communication apparatus includes a connection unit configured to receive a network ID from an access point and connect to a network formed by the access point, a communication unit configured to establish communication with an external device via the network connected by the connection unit and allow data communication, and a processing unit configured to receive a device ID from the external device, compare the network ID of the network connected by the connection unit with the device ID received by the reception unit, and determine whether the external device is operating as the access point based on a result of the comparison by the comparison unit.

Further features of the present disclosure will become apparent from the following description of exemplary embodiments (with reference to the attached drawings).

BRIEF DESCRIPTION OF THE DRAWINGS

FIG. 10 is a flowchart illustrating a process of the digital camera according to the first embodiment.

FIGS. 11A and 11B are flowcharts illustrating processes of the information terminal according to the first embodiment.

DESCRIPTION OF THE EMBODIMENTS (First Embodiment)
(Configuration of Digital Camera)

Figure 1:
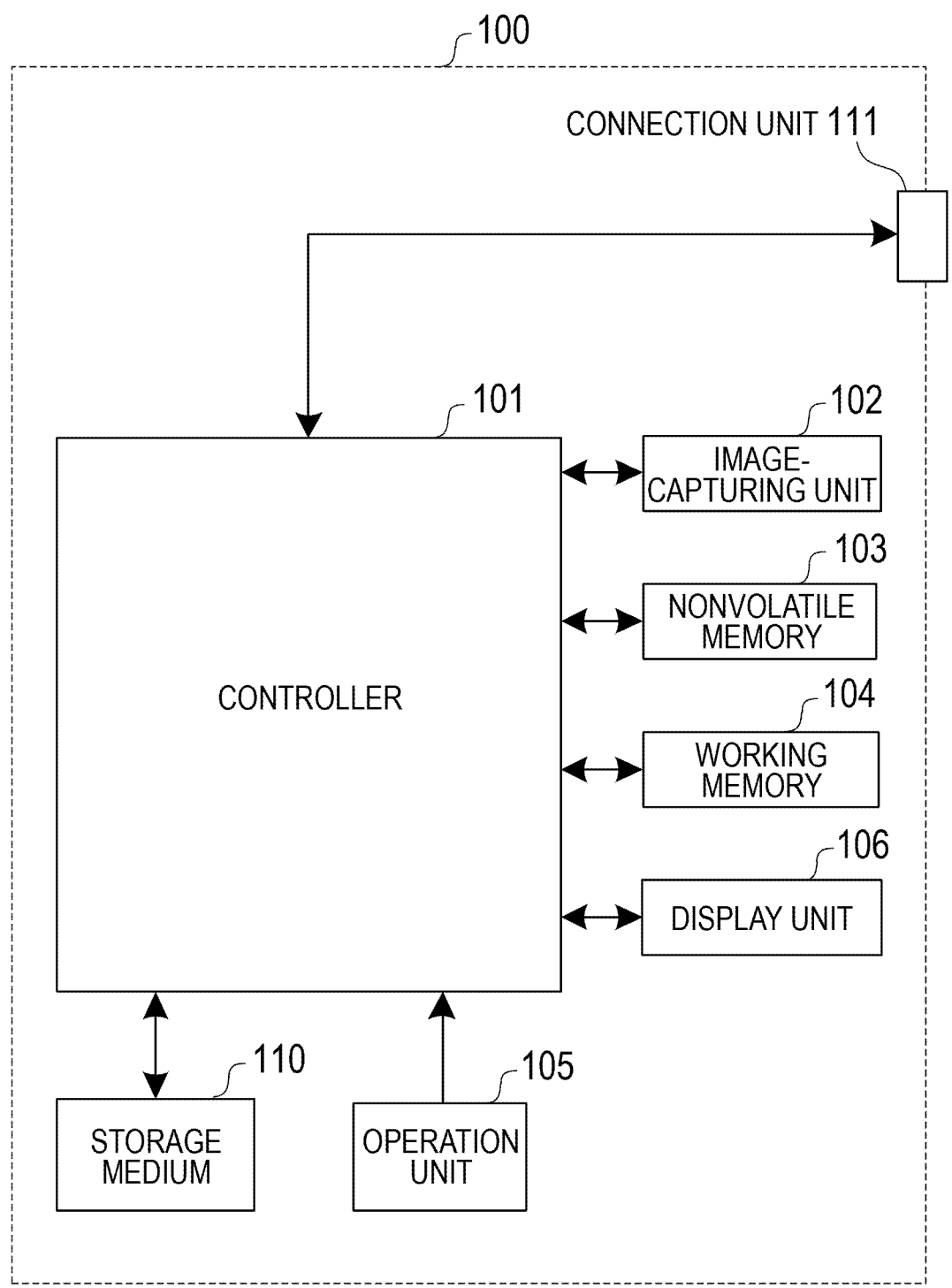
FIG. 1 is a block diagram illustrating a configuration of a digital camera according to a first embodiment.

FIG. 1 is a block diagram illustrating an example of a configuration of a digital camera 100 that is an example of a data processing apparatus in the present embodiment. Although a digital camera is provided as an example of the data processing apparatus, the data processing apparatus is not limited to the digital camera. For example, the data processing apparatus may be an information processing apparatus, such as a portable media player, a tablet device, or a personal computer.

A controller 101 controls each part of the digital camera 100 according to an input signal and a program to be described below. Instead of the controller 101 controlling the entire apparatus, a plurality of hardware units can share a process and control the entire apparatus.

An image-capturing unit 102 converts an object light focused by a lens included in the image-capturing unit 102 into an electric signal, performs a noise reduction process etc., and outputs digital data as image data. After the captured image data is stored in a buffer memory, the controller 101 performs a predetermined calculation, and the image data is stored in a storage medium 110.

A nonvolatile memory 103 is an electrically erasable and recordable nonvolatile memory in which a program etc., to be described below, that is executed by the controller 101 is stored.

A working memory 104 is used as the buffer memory for temporarily storing the image data captured by the image-capturing unit 102, a memory for displaying an image on a display unit 106, a working area for the controller 101, and the like.

An operation unit 105 is used for accepting an instruction to the digital camera 100 from a user. The operation unit 105 includes, for example, operation members such as a power button for an instruction from the user to turn on-off the power of the digital camera 100, a release switch for an instruction to photograph, and a reproducing button for an instruction to reproduce the image data. In addition, a touch panel formed on the display unit 106, which will be described below, is also included in the operation unit 105. Here, the release switch has an SW1 and an SW2. A so-called half-stroke state of the release switch will turn on the SW1. This enables acceptance of an instruction to prepare for photographing, such as an autofocus (AF) process, an automatic exposure (AE) process, an automatic white balance (AWB) process, and a pre-flashing (EF: electronic flash) process. In addition, a so-called full-stroke state of the release switch will turn on the SW2. This enables acceptance of an instruction to photograph.

The display unit 106 displays a viewfinder image in photographing, captured image data, characters for an interactive operation, and the like. Moreover, the display unit 106 may not be included in the digital camera 100. The digital camera 100 may allow connection to the internal or external display unit 106 and have at least a display control function to control display of the display unit 106.

The storage medium 110 can store image data output from the image-capturing unit 102. The storage medium 110 may be configured to be detachable from the digital camera 100 or included in the digital camera 100. That is, the digital camera 100 may have at least means for accessing the storage medium 110.

A connection unit 111 is an interface for connecting to an external apparatus. The digital camera 100 in the present embodiment can exchange data with the external apparatus via the connection unit 111. In addition, in the present embodiment, the connection unit 111 includes an interface for communicating with the external apparatus via a wireless LAN. The controller 101 achieves wireless communication with the external apparatus by controlling the connection unit 111. Note that a communication method is not limited to the wireless LAN.

Furthermore, the digital camera 100 in the present embodiment can operate as a slave apparatus in a network infrastructure mode. When the digital camera 100 operates as the slave apparatus, connection to a nearby access point (hereinafter referred to as an AP) allows the digital camera 100 to participate in a network formed by the AP. Moreover, although the digital camera 100 in the present embodiment is a sort of an AP, the digital camera 100 can also operate as a simple AP (hereinafter referred to as a camera AP) with a more limited function (for example a micro access point). Here, the AP in the present embodiment is an example of a repeater. When the digital camera 100 operates as a simple AP, the digital camera 100 forms a network by itself. An apparatus around the digital camera 100 can recognize the digital camera 100 as an AP and participate in the network formed by the digital camera 100. A program for operating the digital camera 100 as described above is stored in the nonvolatile memory 103.

The digital camera 100 in the present embodiment is a simple AP that does not have a gateway function for transferring data received from a slave apparatus to an Internet provider etc. Accordingly, even if the digital camera 100 receives data from another apparatus that has participated in the network formed by the digital camera 100, the digital camera 100 may not transfer the data to another network, such as the Internet.

The configuration of the digital camera 100 has been described above.

(Configuration of Information Terminal)

Next, an information terminal 200, which is an example of an external connection apparatus, will be described.

Figure 2:
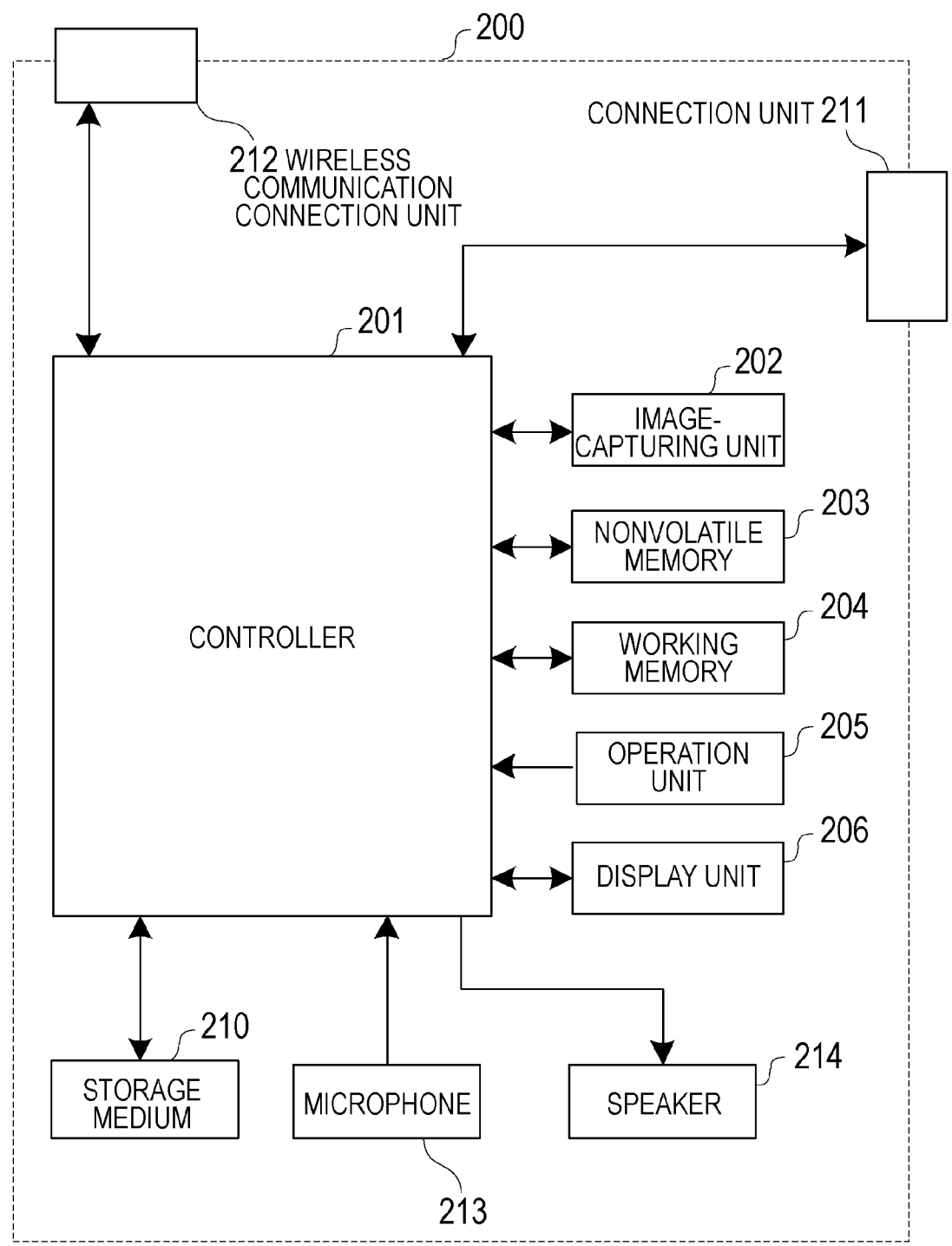
FIG. 2 is a block diagram illustrating a configuration of an information terminal according to the first embodiment.

FIG. 2 is a block diagram illustrating an example of a configuration of the information terminal 200 that is an example of a communication apparatus in the present embodiment. Although a portable information terminal, typified by a mobile phone, will be described here as an example of the communication apparatus, the communication apparatus is not limited to the portable information terminal. For example, the communication apparatus may be an information processing apparatus, such as a digital camera with a wireless function, a portable media player, a so-called tablet device, and a personal computer.

A controller 201 controls each part of the information terminal 200 according to an input signal and a program to be described below. Moreover, instead of the controller 201 controlling the entire apparatus, a plurality of hardware units may share a process and control the entire apparatus.

An image-capturing unit 202 converts an object light focused by a lens included in the image-capturing unit 202 into an electric signal, performs a noise reduction process etc., and outputs digital data as image data. After the captured image data is stored in a buffer memory, the controller 201 performs a predetermined calculation, and the image data is stored in a storage medium 210.

A nonvolatile memory 203 is an electrically erasable and recordable nonvolatile memory in which various programs and the like that are executed by the controller 201 are stored. A program for communicating with the digital camera 100 is also stored in the nonvolatile memory 203 and installed as a camera communication application. In addition, processing of the information terminal 200 in the present embodiment is achieved by loading a program provided by the camera communication application. Also, the camera communication application includes a program for utilizing a basic function of an operating system (OS) installed in the information terminal 200. Alternatively, the OS of the information terminal 200 may include a program for achieving the process in the present embodiment.

A working memory 204 is used as the buffer memory for temporarily storing the image data generated by the image-capturing unit 202, a memory for displaying an image on a display unit 206, a working area for the controller 201, and the like.

An operation unit 205 is used for accepting an instruction to the information terminal 200 from a user. The operation unit 205 includes, for example, operation members such as a power button for an instruction from the user to turn on-off of the power of the information terminal 200, and a touch panel formed on the display unit 206.

The display unit 206 displays image data, characters for an interactive operation, and the like. The display unit 206 may not be included in the information terminal 200. The information terminal 200 may allow connection to the display unit 206 and have at least a display control function to control display of the display unit 206.

The storage medium 210 can store the image data output from the image-capturing unit 202. The storage medium 210 may be configured to be detachable from the information terminal 200 or included in the information terminal 200. That is, the information terminal 200 may have at least means for accessing the storage medium 210.

A connection unit 211 is an interface for connecting to an external apparatus. The information terminal 200 in the present embodiment can exchange data with the external apparatus via the connection unit 211. In addition, in the present embodiment, the connection unit 211 includes an interface for communicating with the external apparatus via a wireless LAN. The controller 201 achieves wireless communication with the external apparatus by controlling the connection unit 211. Moreover, the digital camera 100 in the present embodiment can operate at least as a slave apparatus in an infrastructure mode and participate in a network formed by a nearby AP.

A wireless communication connection unit 212 is an interface used for performing public wireless communication. The information terminal 200 can make a telephone call to another apparatus and perform data communication via the wireless communication connection unit 212. In making a telephone call, the controller 201 inputs and outputs an audio signal via a microphone 213 and a speaker 214. In the present embodiment, the wireless communication connection unit 212 includes an interface for communication using 3G. In addition, not only 3G but also other communication methods, referred to as so-called 4G, may be used, such as WiMAX, ADSL, FTTH, and LTE. Furthermore, the external interface connection unit 211 and the wireless communication connection unit 212 may not include separate hardware. For example, a single antenna may serve both functions. The configuration of the information terminal 200 has been described above.

(Summary of Connection Configurations)

Figure 3A:
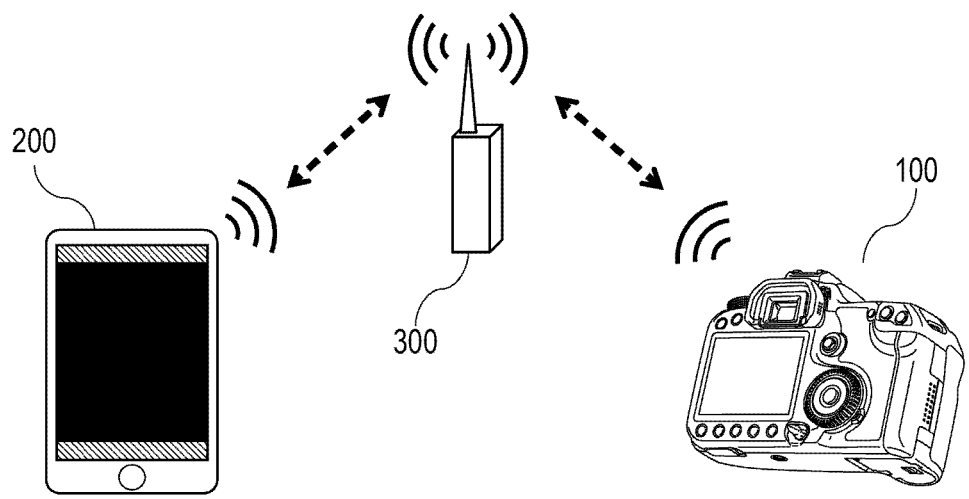
FIGS. 3A and 3B illustrate configurations of a network according to the first embodiment.
Figure 3B:
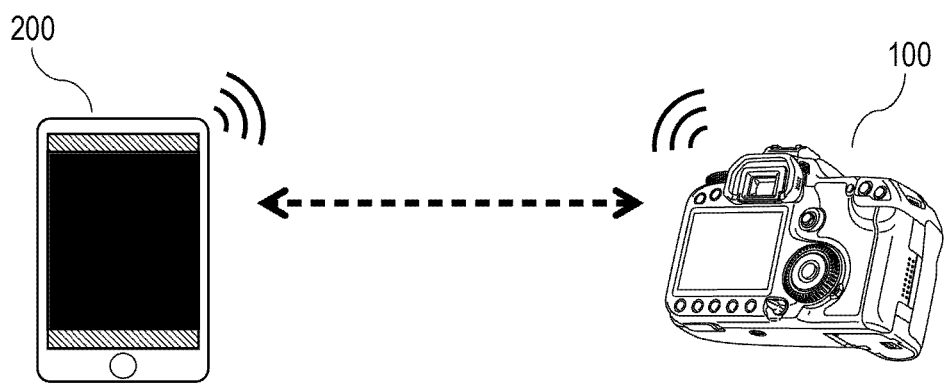

FIGS. 3A and 3B schematically illustrate connection configurations between the digital camera 100 and the information terminal 200 in the present embodiment. When the digital camera 100 and the information terminal 200 transmit and receive data wirelessly, two connection configurations described in FIGS. 3A and 3B can be considered.

FIG. 3A illustrates a configuration in which the digital camera 100 and the information terminal 200 participate in a wireless LAN network formed by an external AP 300 that is an example of an external repeater. This configuration is referred to as an infrastructure mode. The digital camera 100 and the information terminal 200 sense a beacon signal regularly transmitted by the external AP 300, and participate in the wireless LAN network formed by the external AP 300. After participating in the same wireless LAN network and going through a mutual device discovery and a device capability acquisition, the digital camera 100 and the information terminal 200 reach a state in which data can be transmitted and received over the wireless LAN (Communication between apparatuses is established).

Moreover, the external AP 300 in the present embodiment can also be connected to an external network, such as the Internet, using a public network etc. Thus, the information terminal 200 can transmit data to the Internet via the external AP 300.

FIG. 3B illustrates a connection configuration, referred to as a camera AP mode, in which the digital camera 100 and the information terminal 200 are directly connected, not via the external AP 300. In this case, the digital camera 100 operates as a simple AP and forms a wireless LAN network. When the digital camera 100 operates as the simple AP, the digital camera 100 starts regular transmission of a beacon signal. The information terminal 200 senses the beacon signal and participates in the wireless LAN network formed by the digital camera 100. In a similar way to the case in FIG. 3A, after going through a mutual device discovery and a device capability acquisition, communication is established, and the digital camera 100 and the information terminal 200 reach a state in which data can be transmitted and received.

As described above, the digital camera 100 and the information terminal 200 have two connection configurations. In the present embodiment, a method will be described for performing appropriate control depending on the connection configuration between the digital camera 100 and the information terminal 200.

(Preparation for Connection Process)

Figure 4A:
FIGS. 4A to 4C illustrate screens of the digital camera according to the first embodiment.
Figure 4B:
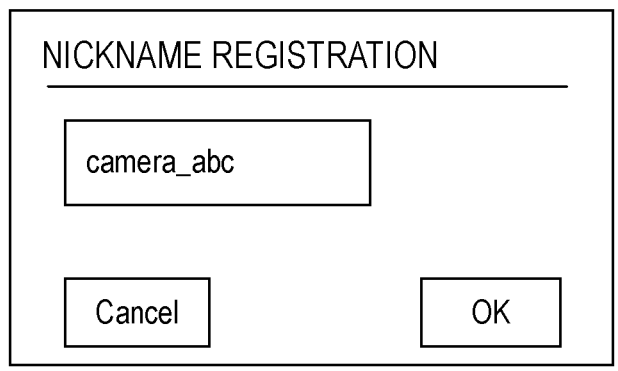
Figure 4C:
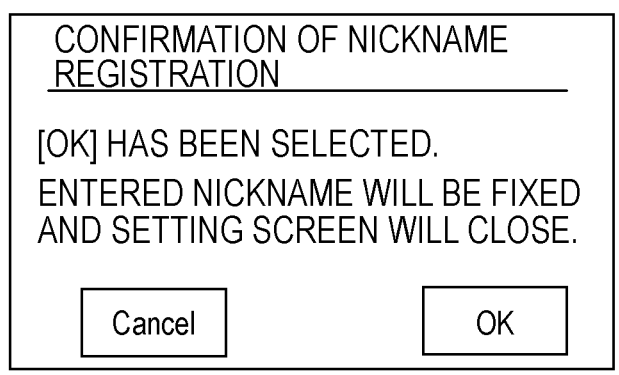

FIGS. 4A to 4C illustrate an example of a graphical user interface (GUI), displayed on the display unit 106, for illustrating a flow of a preparation process to be performed by the digital camera 100 when the digital camera 100 is connected to the information terminal 200.

FIGS. 4A to 4C illustrate a process of assigning a unique identification name, referred to as "nickname", to the digital camera 100. First, when the user performs a predetermined menu operation, a screen illustrated in FIG. 4A is displayed. Pressing down an OK button here causes a screen illustrated in FIG. 4B to be displayed. On this screen, any nickname is entered based on the user operation. Pressing down an OK button causes a confirmation screen illustrated in FIG. 4C to be displayed. Pressing down an OK button here causes the nickname to be stored in the nonvolatile memory 103 of the digital camera 100.

This nickname is detected as a camera name when the digital camera 100 participates in the network. When the digital camera 100 operates as the camera AP, the nickname is used as an SSID that is a service set identifier for a wireless LAN.

(Connection Process)

Figure 5:
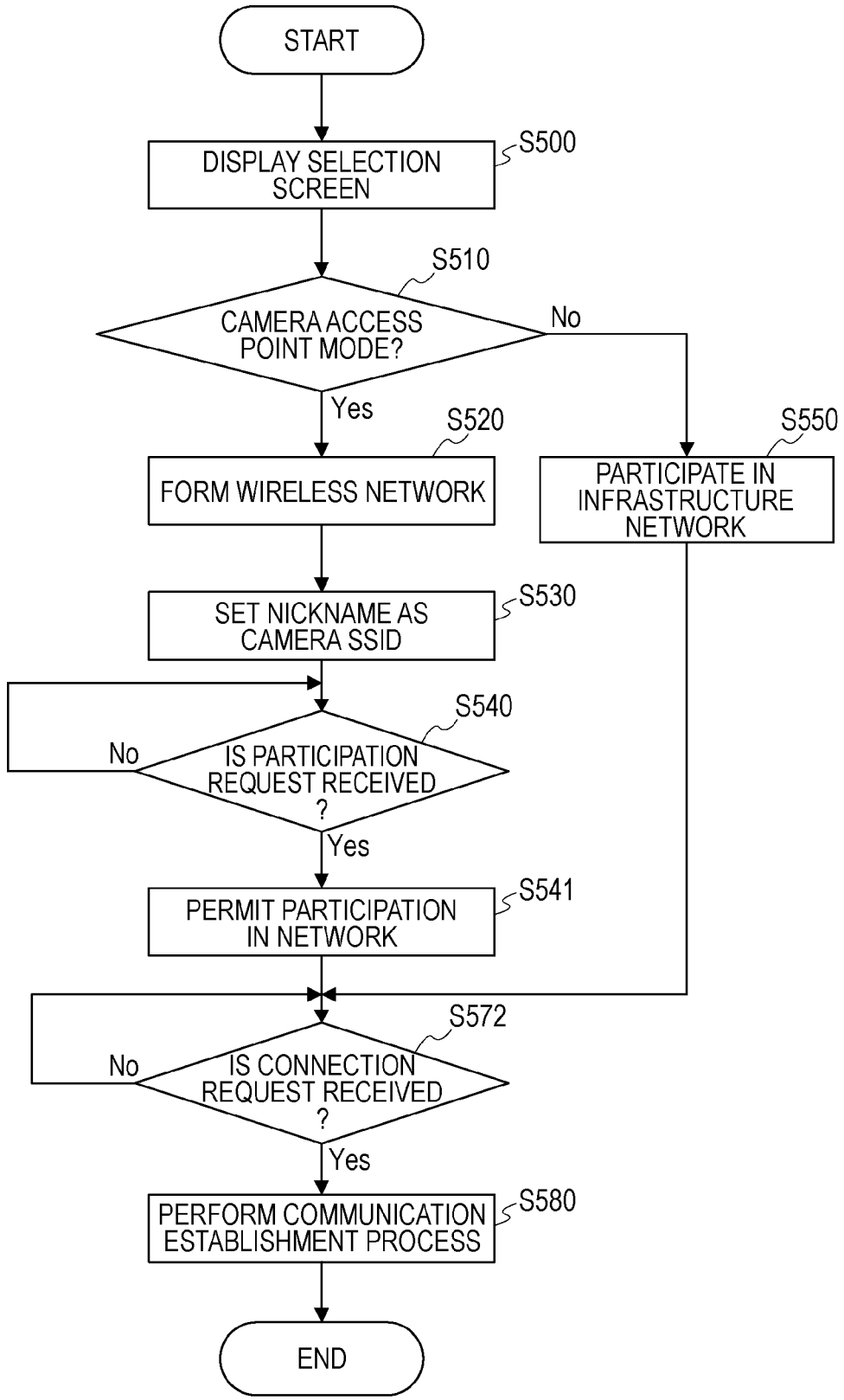
FIG. 5 is a flowchart illustrating a process of the digital camera according to the first embodiment.

FIG. 5 is a flowchart illustrating a process of the digital camera 100 when the digital camera 100 is connected to the information terminal 200. Moreover, the process illustrated in this flowchart is achieved by the controller 101 of the digital camera 100 controlling each part of the digital camera 100 according to an input signal and a program. Unless otherwise specified, other flowcharts illustrating processes of the digital camera 100 are the same. This flowchart starts in response to the user of the digital camera 100 instructing to configure the wireless LAN setting by the menu operation etc.

Figure 6A:
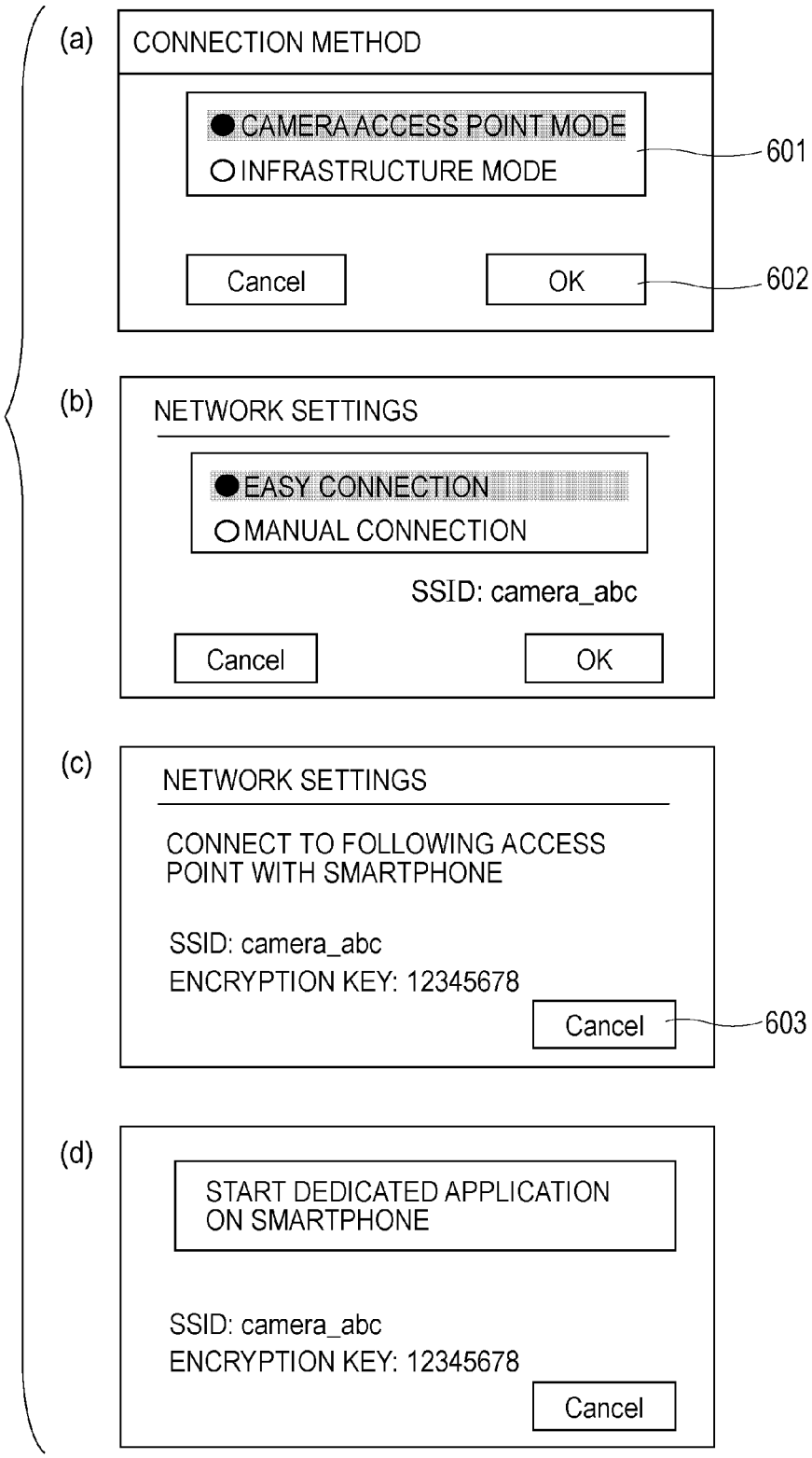
FIGS. 6A(a) to 6A(d) illustrate screens of the digital camera according to the first embodiment.

In step S500, the controller 101 displays, on the digital camera display unit 106, a screen prompting the user to select whether to participate in a wireless LAN network formed by an external AP, or to allow the digital camera 100 to operate as a simple AP. FIG. 6A(a) illustrates an example of the screen displayed in this step.

In step S510, the user operation selects one operation mode of the wireless LAN in a mode selection list 601 and presses down an OK button 602.

(Camera AP Mode)

First, a case where the camera AP mode has been selected will be described. In this case, the controller 101 determines that formation of a wireless LAN network by the digital camera 100 itself has been selected, and the process proceeds to step S520. Here, the connection process is performed through setting screens as illustrated in FIGS. 6A(b) to 6A(d).

In step S530, the nickname assigned to the digital camera 100 is set as the SSID of the wireless network formed by the digital camera 100. In addition, an encryption key is also generated dynamically.

In step S540, the controller 101 waits for a participation request in the network of the digital camera 100 from the information terminal. Here, the controller 101 displays a screen illustrated in FIG. 6A(c). FIG. 6A(c) illustrates the SSID and the encryption key set in step S530. The user of the information terminal 200 can transmit a participation request to the digital camera 100 that is operating as the camera AP by operating the information terminal 200 and entering the SSID and the encryption key displayed in FIG. 6A(c).

In step S540, when the controller 101 determines that the participation request is received from the information terminal 200, in step S541, the controller 101 allows the information terminal 200 to participate in the network formed by the digital camera 100. Note that the digital camera 100 only allows the information terminal 200 to participate in the network as an AP. Communication between apparatuses has not been established yet at this time.

In step S572, the controller 101 displays a screen in FIG. 6A(d) and waits for a connection request from the information terminal 200. Since it is necessary to start up the camera communication application in order for the information terminal 200 in the present embodiment to transmit a connection request to the digital camera 100, FIG. 6A(d) displays a message for prompting the user to start up the application. While it is determined in step S540 whether a network participation request occurs, it is determined in step S572 whether a communication request between apparatuses occurs.

When the connection request occurs, the controller 101 establishes communication with the information terminal 200 in step S580. Completion of this process enables transmission and reception of image data between the digital camera 100 and the information terminal 200, and the like. The flow of the connection process of the digital camera 100 has been described above.

A process of the information terminal 200 in the connection process will now be described.

Figure 7A:
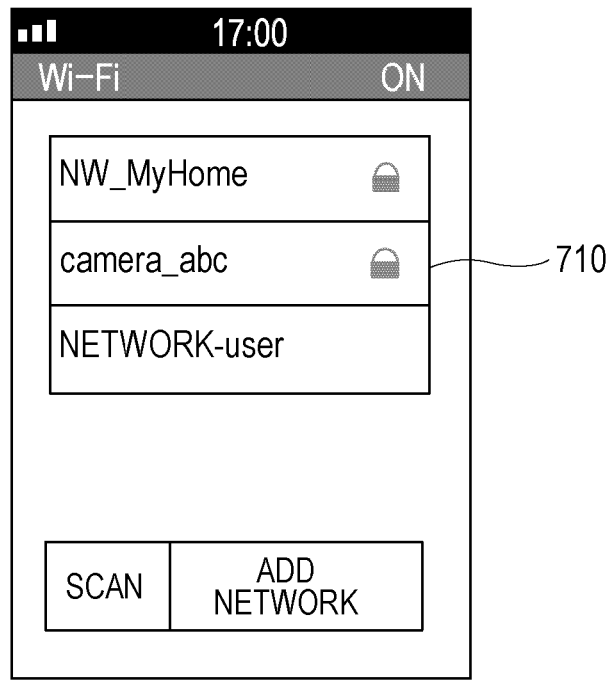
FIGS. 7A and 7B illustrate screens of the information terminal according to the first embodiment.

FIG. 7A illustrates a network setting screen displayed on the display unit 206 of the information terminal 200. This screen is displayed by a predetermined user operation or the like. When the display transitions to this screen, the information terminal 200 scans a surrounding area of the information terminal 200 to search for an available AP. Then, detected APs are list-displayed as a scan result list 710 on the screen illustrated in FIG. 7A. Here, when the digital camera 100 is operating as a camera AP, the AP indicating the digital camera 100 is displayed on this screen. In FIG. 7A, the AP indicating the digital camera 100 is displayed as "camera_abc" on the scan result list 710. The user of the information terminal 200 can recognize information for accessing the digital camera 100 by checking the display unit 106 (FIG. 6A(c)) of the digital camera 100.

Figure 7B:
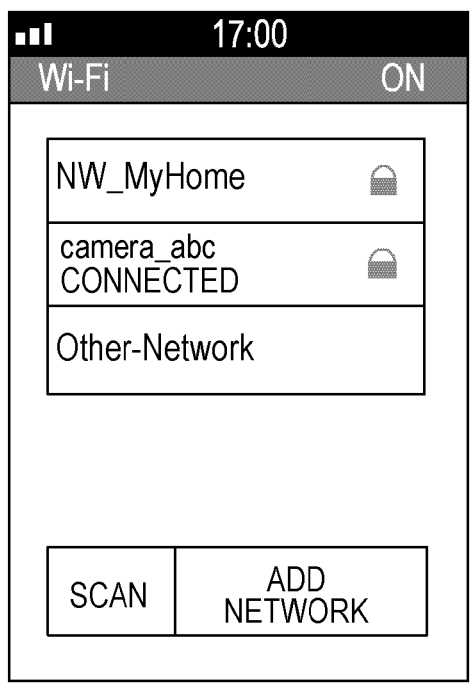

When the camera AP of the digital camera 100 is selected from the scan result list 710 and the encryption key is entered, a network participation request is transmitted to the digital camera 100. Upon receiving this request (step S540), the digital camera 100 permits the information terminal 200 to participate in the network (step S541) and notifies the permission. In response to the notification being received, a box of "camera_abc" changes to a display indicating "CONNECTED" as illustrated in FIG. 7B. As a result, the information terminal 200 has participated in the network formed by the digital camera 100. Here, in the present embodiment, the process for participating in a network is not a function of the camera communication application but a function of the OS of the information terminal 200. In addition, examples of functions of the OS of the information terminal 200 in the present embodiment include a history connection function. According to this function, the information terminal 200 saves information on an AP to which the information terminal 200 has previously been connected in the nonvolatile memory 203 as history information. Then, when performing a next AP connection process, the information terminal 200 automatically transmits a participation request to an AP, among APs present in a surrounding area, to which the information terminal 200 has recently connected, and attempts authentication. In this way, time and labor needed to connect to the same AP again may be reduced.

(Infrastructure Mode)

Figure 6B:
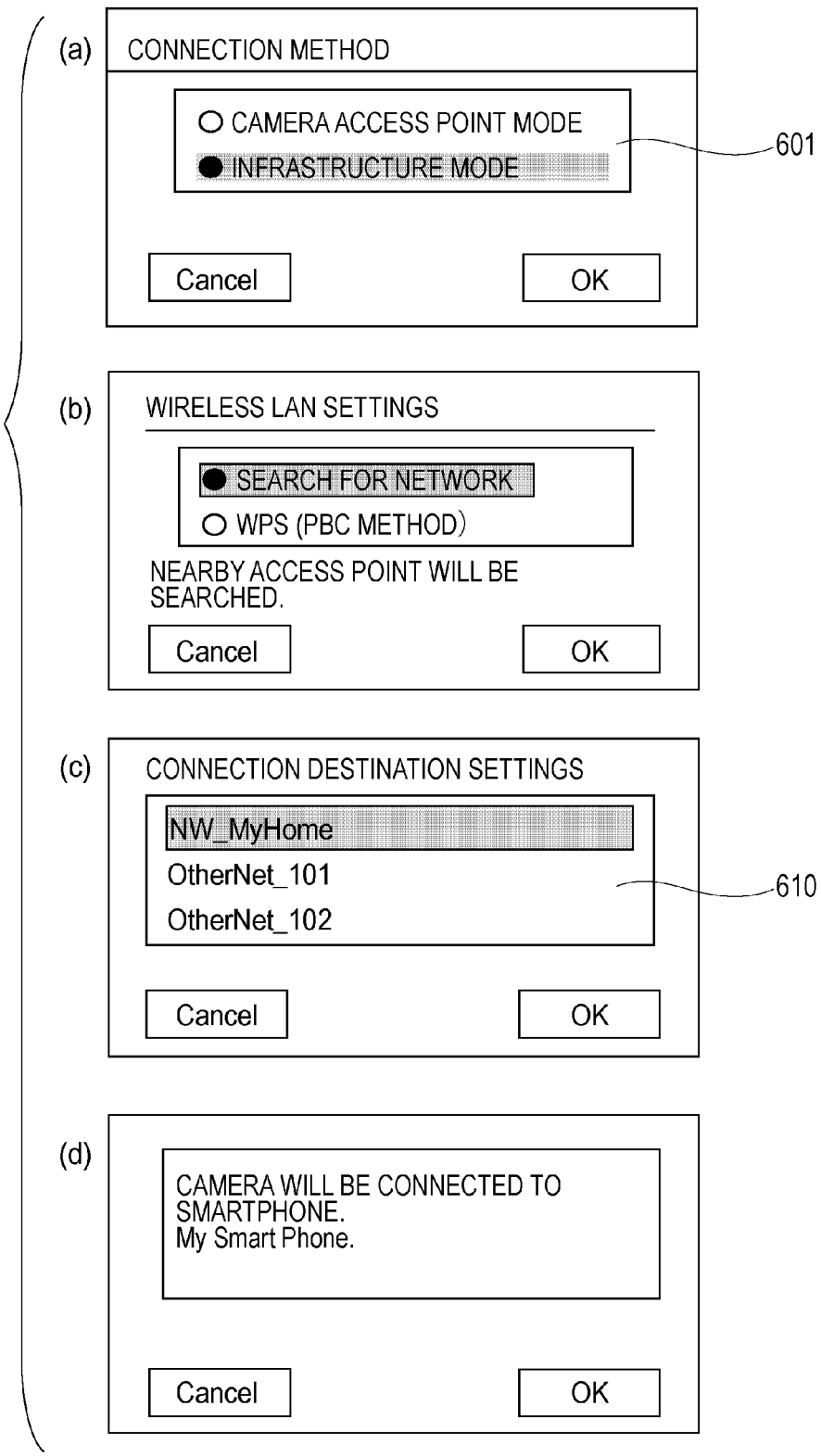
FIGS. 6B(a) to 6B(d) illustrate screens of the digital camera according to the first embodiment.

A case where it is determined that the infrastructure mode has been selected in step S510 illustrated in FIG. 5 will be described below. In this case, the controller 101 determines that participation in a wireless LAN network formed by an external AP is selected and the process proceeds to step S572. FIGS. 6B(a) to 6B(d) illustrate a screen transition of the digital camera 100 when the infrastructure mode is selected.

In step S550, the controller 101 searches for an AP present in a surrounding area and displays a list of SSIDs contained in a resulting detected beacon signal in a list area 610 of the display unit 106. FIG. 6B(c) illustrates an example of a screen in this case. The example in FIG. 6B(c) illustrates that three SSIDs, "NW-MyHome", "OtherNet_101", and "OtherNet_102", have been detected. Selection of a wireless LAN network from the list 610 in FIG. 6B(c) by the user operation causes the controller 101 to transmit a network participation request to the selected wireless LAN network and to participate in the network.

The digital camera 100 that has participated in the network waits for a connection request from the information terminal 200, and when the connection request is received, a screen illustrated in FIG. 6B(d) is displayed. In the present embodiment, the digital camera 100 receives a device name as well as the connection request from the information terminal 200, and displays the device name on the screen illustrated in FIG. 6B(d). Moreover, the received device name is saved in the nonvolatile memory 103 of the digital camera 100. When "OK" is selected on the screen illustrated in FIG. 6B(d), communication between apparatuses is established in step S580. The process of the digital camera 100 performed until communication is established between apparatuses has been described above.

(Connection Process of Information Terminal)

A process of the information terminal 200 performed until communication is established will now be described with reference to FIG. 8.

Figure 8:
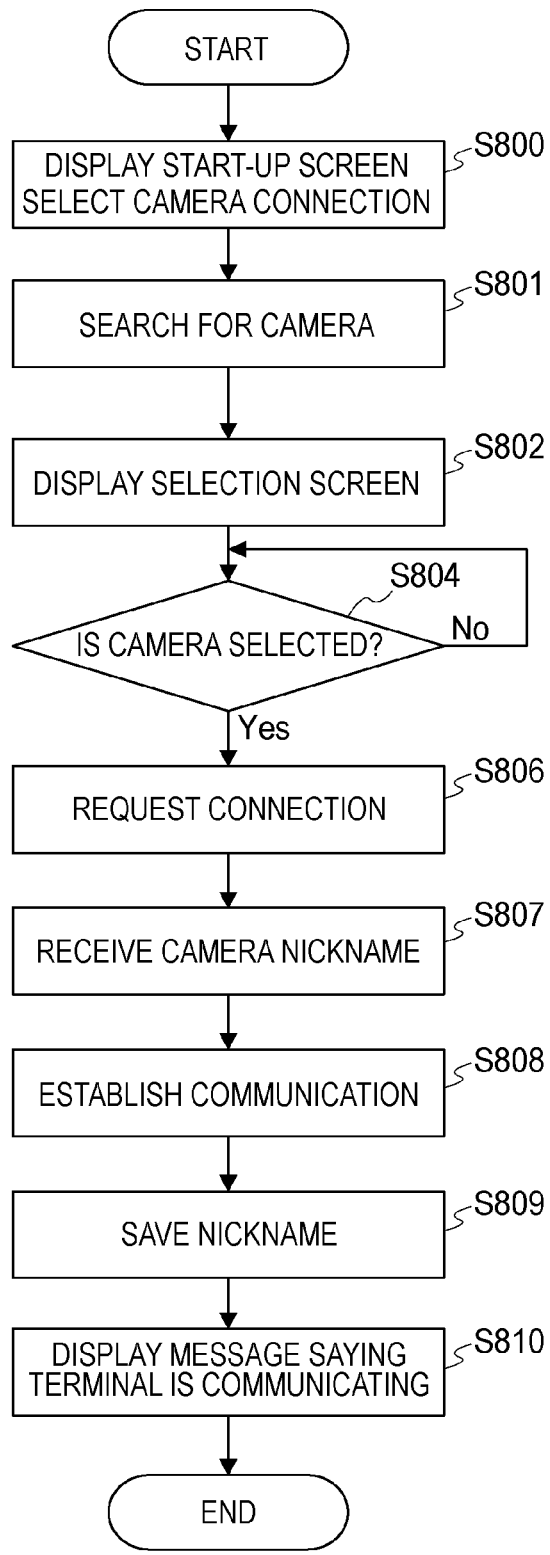
FIG. 8 is a flowchart illustrating a process of the information terminal according to the first embodiment.

FIG. 8 is a flowchart illustrating a process of the information terminal 200 communicating with the digital camera 100 in the present embodiment. This flowchart starts in response to an instruction from the user of the information terminal 200 to start up the camera communication application. In addition, this flowchart illustrates a process in which the information terminal 200 establishes communication with the digital camera for the first time. Specifically, when the information terminal 200 has not registered any nickname of a digital camera, the process in this flowchart is performed. Meanwhile, when a nickname of a digital camera has already been registered, a flowchart in FIG. 13 described below will be performed. The process illustrated in FIG. 8 is achieved by the controller 201 of the information terminal 200 controlling each part of the information terminal 200 based on a program and an input signal. Unless otherwise specified, other flowcharts illustrating processes of the information terminal 200 are the same.

Figure 9A:
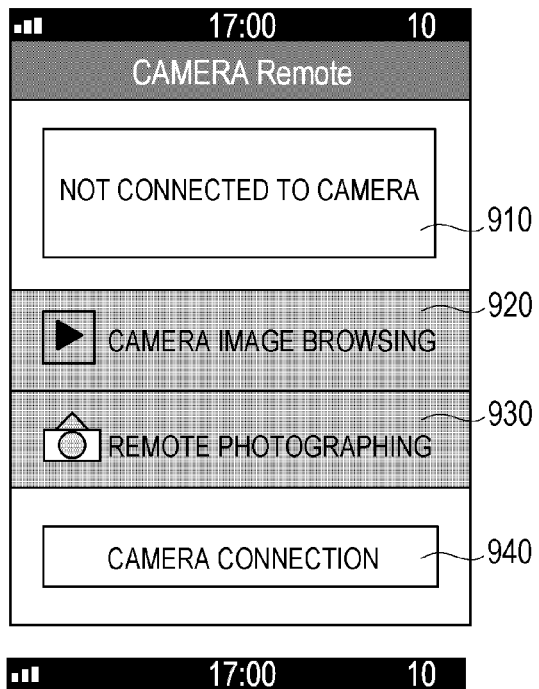
FIGS. 9A to 9C illustrate screens of the information terminal according to the first embodiment.

In step S800, the controller 201 displays a start-up screen of the camera communication application on the display unit 206. FIG. 9A illustrates an example of the start-up screen. Immediately after the start-up, since the information terminal 200 has not established communication with the digital camera 100 yet, a notification area 910 displays a message indicating the communication status. An image browse button 920 and a remote photographing button 930, each of which is a function that can be used after communication with the digital camera 100 is established, are in a state where a selection operation is not accepted at this time. A camera connection button 940 is a button for an instruction to establish communication with the digital camera 100. In response to selection of the camera connection button 940, the process proceeds to step S801.

Next, in step S801, the controller 201 transmits an inquiry to an apparatus around the information terminal 200 and searches for a nearby digital camera.

Figure 9B:
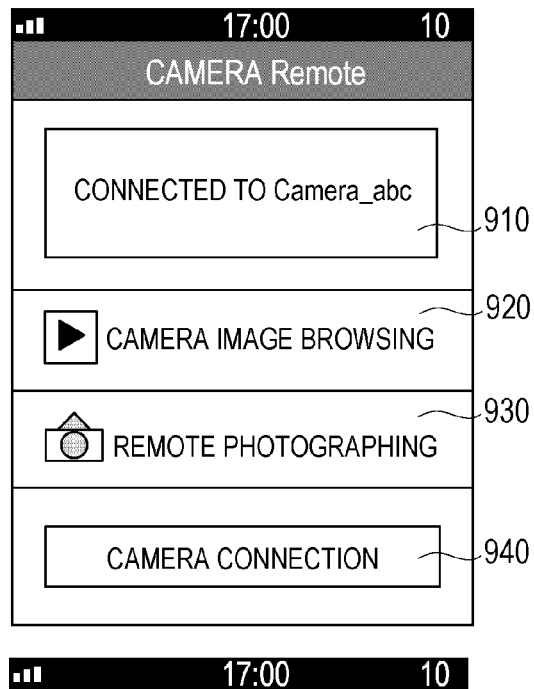
Figure 9C:
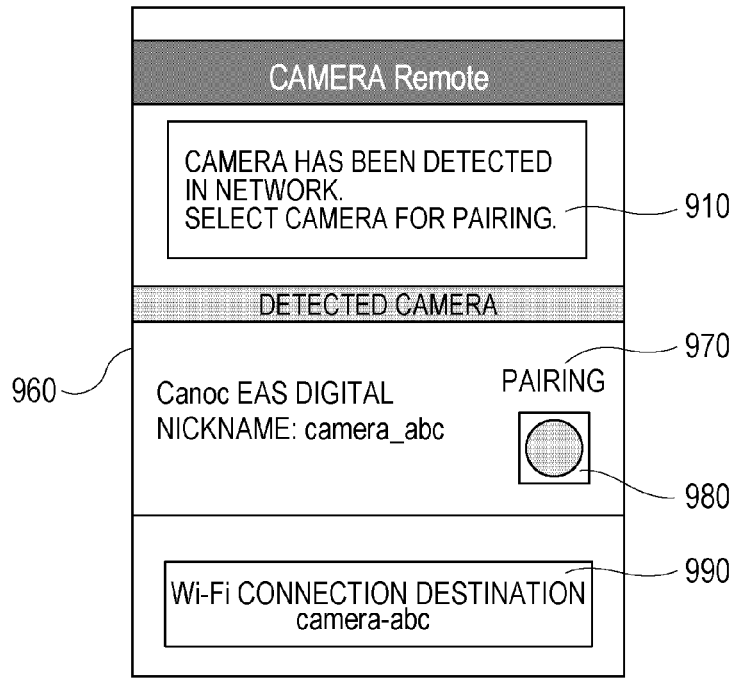

In step S802, the controller 201 displays a screen in which a user selects a digital camera with which communication is to be established among detected digital cameras. FIG. 9C illustrates an example of the selection screen. The example in FIG. 9C represents establishment of communication with a digital camera to the user by a word "pairing". Although FIG. 9C illustrates the example in which one digital camera has been detected, a plurality of digital cameras may exist in the network. In this case, a display area 960 list-displays device names and nicknames of the detected digital cameras.

In step S804, the controller 201 waits for selection of a digital camera with which communication is to be established. Specifically, when a user operation selects a digital camera and presses down a connection button 980, it is determined that the digital camera has been selected. When it is determined that the selection has been carried out, the process proceeds to step S806. A case will be described below where the digital camera 100 has been selected.

Next, in step S806, the controller 201 transmits a connection request to the digital camera 100.

When the process proceeds to step S807, the controller 201 requests for the nickname of the digital camera 100 and receives the nickname of the digital camera 100 transmitted in response to the request.

In step S808, the controller 201 exchanges other information required for communication with the digital camera 100 and establishes communication with the digital camera 100. This process corresponds to step S580 in FIG. 5. When communication is established and the start-up screen is displayed again, as illustrated in FIG. 9B, the notification area 910 displays a message saying that communication has been established with Camera_abc.

Next, in step S809, the controller 201 registers the nickname of the digital camera 100 by saving the nickname in the nonvolatile memory 203.

In step S810, the controller 201 displays, on the display unit 206, a message saying that the information terminal 200 is communicating with the digital camera 100, and terminates the process.

After going through the process described above, the information terminal 200 and the digital camera 100 can exchange commands such as a command for transmission or reception of image data.

(Operation after Connection)

An operation of the information terminal 200 that uses the camera communication application after establishment of communication with the digital camera 100 will be described below. The camera communication application in the present embodiment may receive an image stored in the storage medium 110 of the digital camera 100 with which communication has been established, and display the image on the display unit 206. The camera communication application also allows the information terminal 200 to remotely control the digital camera 100. Details will now be described.

FIGS. 11A and 11B are flowcharts illustrating an operation of the information terminal 200 that executes the camera communication application after establishment of communication with the digital camera 100.

First, the operation performed until the image data stored in the storage medium 110 of the digital camera 100 is list-displayed on the display unit 206 of the information terminal 200 will be described with reference to FIG. 11A.

When communication with the digital camera 100 is established, the controller 201 of the information terminal 200 again displays a menu screen of the camera communication application illustrated in FIG. 9B. The menu screen displays the image browse button 920 and the remote photographing button 930. The image browse button 920 is a button for displaying, on the display unit 206, image data saved in the digital camera 100 with which communication has been established.

In step S1110, the controller 201 determines whether the image browse button 920 has been selected. When it is determined that the image browse button 920 has been selected, the process proceeds to step S1120. When it is determined that the image browse button 920 has not been selected, the process repeats step S1110.

In step S1120, the controller 201 requests, from the digital camera 100, a thumbnail of the image data that the digital camera 100 has. In response to this request, the digital camera 100 transmits the requested thumbnail to the information terminal 200. The thumbnail may be requested repeatedly on a sheet basis, or a command may be transmitted requesting a plurality of sheets together.

In step S1130, the information terminal 200 receives the thumbnail transmitted from the digital camera 100 via the connection unit 211.

Figure 12A:
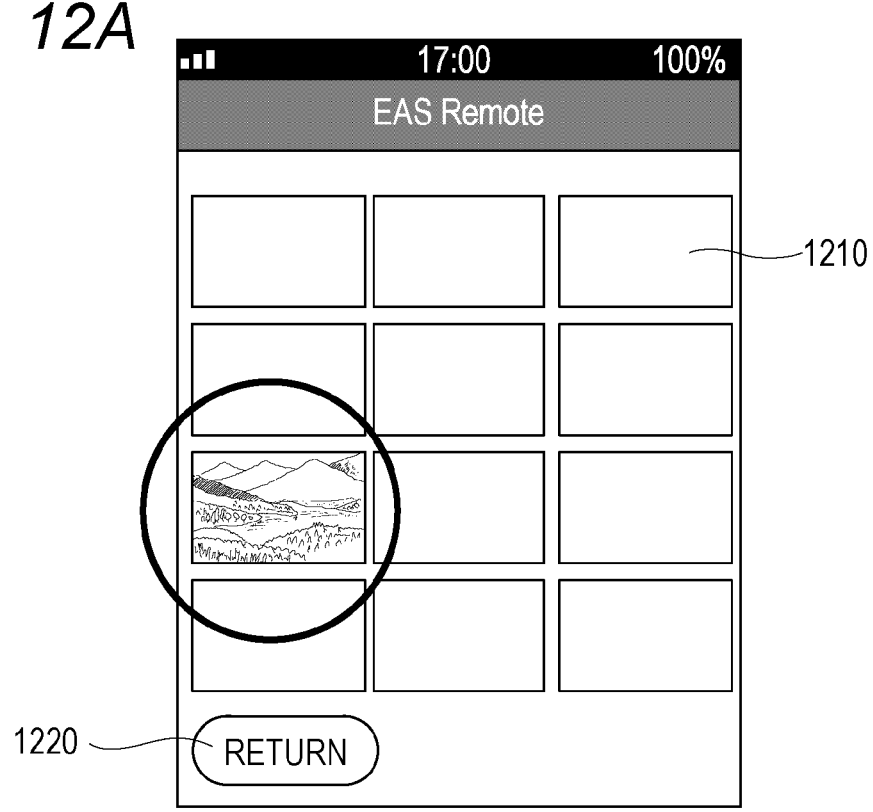
FIGS. 12A and 12B illustrate screens of the information terminal according to the first embodiment.

In step S1140, the controller 201 list-displays the received thumbnail on the display unit 206. FIG. 12A illustrates an example of a display screen. In the example in FIG. 12A, thumbnails are displayed in three columns, and a scrolling operation in a vertical direction further allows display of other image data.

In step S1150, the controller 201 determines whether a return button 1220 on the screen in FIG. 12A has been pressed down. When it is determined that the return button 1220 has been pressed down, the process ends. When it is determined that the return button 1220 has not been pressed down, the thumbnail list-display continues.

Next, the operation performed until main image data corresponding to a desired thumbnail among list-displayed thumbnails is saved in the information terminal 200 will be described with reference to the flowchart in FIG. 11B.

In step S1160, the controller 201 determines whether any one of the list-displayed thumbnails has been selected. When it is determined that a thumbnail has been selected, the process proceeds to step S1170. When it is determined that a thumbnail has not been selected, the process returns to step S1160.

Figure 12B:
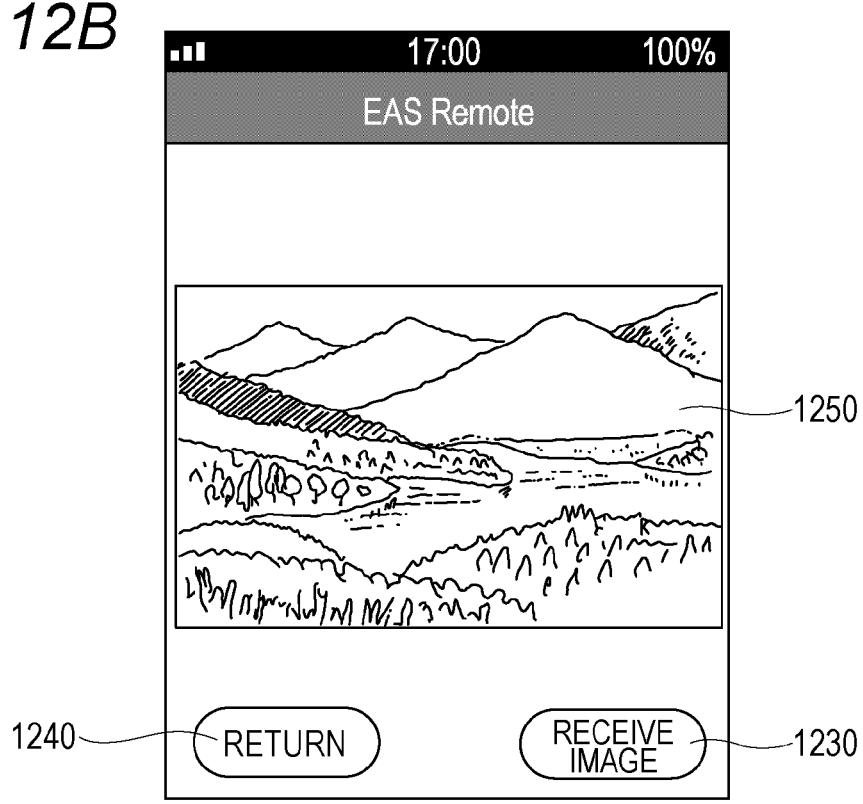

In step S1170, the controller 201 displays the selected thumbnail in a large size. FIG. 12B illustrates an example of the display. As illustrated in FIG. 12B, the selected thumbnail is displayed in a size larger than that in FIG. 12A. Although the selected thumbnail is displayed as it is in a large size in step S1170, in view of displaying in a large size, a larger thumbnail or main image data may be requested again from the digital camera 100.

In addition, the screen illustrated in FIG. 12B includes an image-receiving button 1230. The image-receiving button 1230 is a button for receiving main image data corresponding to the currently displayed thumbnail from the digital camera.

In step S1180, the controller 201 determines whether the RETURN button 1240 illustrated in FIG. 12B has been pressed down. When it is determined that the button has not been pressed down, the process proceeds to step S1185. When it is determined that the button has been pressed down, the process terminates.

In step S1185, the controller 201 determines whether the image-receiving button 1230 illustrated in FIG. 12B has been pressed down. When it is determined that the button has been pressed down, the process proceeds to step S1190. When it is determined that the button has not been pressed down, the process returns to step S1180.

When the process proceeds to step S1190, the controller 201 requests main image data corresponding to the thumbnail selected in step S1160 from the digital camera 100. When the digital camera 100 transmits the main image data to the information terminal 200 in response to the request, the information terminal 200 receives the main image data, saves the main image data in the nonvolatile memory 203, and terminates the process. The operation of the information terminal 200 after establishing communication with the digital camera 100 has been described above.

Meanwhile, an operation of the digital camera 100 after establishing communication with the information terminal 200 will now be described with reference to FIG. 10. The process illustrated in FIG. 10 is achieved by the controller 101 of the digital camera 100 controlling each part of the digital camera 100 based on a program and an input signal.

In step S1000, the controller 101 of the digital camera 100 determines whether a request from the information terminal 200 has been received via the connection unit 111. When it is determined that the request has been received, the process proceeds to step S1010, and when it is determined that the request has not been received, the process proceeds to step S1050.

In step S1010, the controller 101 determines whether the received request is a request for a thumbnail. When it is determined that the received request is a request for a thumbnail, the process proceeds to step S1020. When it is determined that the received request is not a request for a thumbnail, the process proceeds to step S1030.

First, a case where the process proceeds to step S1020 will be described. In step S1020, the controller 101 searches for image data requested by the information terminal 200 among image data saved in the storage medium 110, and loads a thumbnail corresponding to the detected image data in the working memory 104. It is also possible to load a plurality of thumbnails. In this case, a thumbnail already associated with the image data may be used, or a new thumbnail may be created separately.

Then, in step S1025, the controller 101 transmits the thumbnail stored in the working memory 104 to the requesting information terminal 200, and returns the process to step S1000. As a result of this process, the information terminal 200 performs a thumbnail receiving process.

The process of the digital camera 100 transmitting a thumbnail to the information terminal 200 has been described above.

Next, a case where the process proceeds to step S1030 will be described. In step S1030, the controller 101 determines whether the received request is a request for image data corresponding to the thumbnail. When it is determined that the received request is a request for image data, the process proceeds to step S1040. When it is determined that the received request is not a request for image data, the process proceeds to step S1090.

First, a case where the process proceeds to step S1040 will be described. In step S1040, the controller 101 searches for the requested image data from image data saved in the storage medium 110, and loads the detected image data in the working memory 104.

Then, in step S1045, the controller 101 transmits the image data stored in the working memory 104 to the information terminal 200, and returns the process to step S1000. As a result of this process, the information terminal 200 performs an image data-receiving process.

Meanwhile, in a case where the process proceeds to step S1090, the controller 101 determines that the digital camera 100 cannot properly respond to the received request, and transmits, to the information terminal 200, an error notification indicating the determination described above.

Next, a case where the process proceeds from step S1000 to step S1050 will be described. In step S1050, the controller 101 determines whether the connection has been disconnected. Examples of a case where it is determined in this step that the connection has been disconnected include a case where the communication that has been established with the information terminal 200 has been disconnected, a case where the information terminal 200 is not present in the network, and a case where the digital camera 100 fails to receive a beacon signal from an AP and has lost the network. When the digital camera 100 is operating in a camera AP mode, however, the network will not be lost. When it is determined that the connection has been disconnected, the process proceeds to step S1060. When it is determined that the connection has not been disconnected, the process returns to step S1000.

In step S1060, the controller 101 determines whether the digital camera 100 is operating as a camera AP. When it is determined that the digital camera 100 is not operating as a camera AP, the process proceeds to step S1080. When it is determined that the digital camera is operating as a camera AP, the controller 101 terminates the process in order to return to a standby state again to prepare for a connection process from the information terminal 200.

In step S1080, the controller 101 performs a disconnection process from the currently participating network and similarly terminates the process in order to return to the standby state for reconnection.

The process of the digital camera 100 transmitting image data to the information terminal 200 has been described above.

As described above, the information terminal 200 in the present embodiment saves information on an AP to which connection has previously been made as history information in the nonvolatile memory 203. Then, when performing a next AP connection process, the information terminal 200 attempts automatic connection to a most recently connected AP among APs that are present in a surrounding area.

(Second and Subsequent Connection Process)

Figure 13:
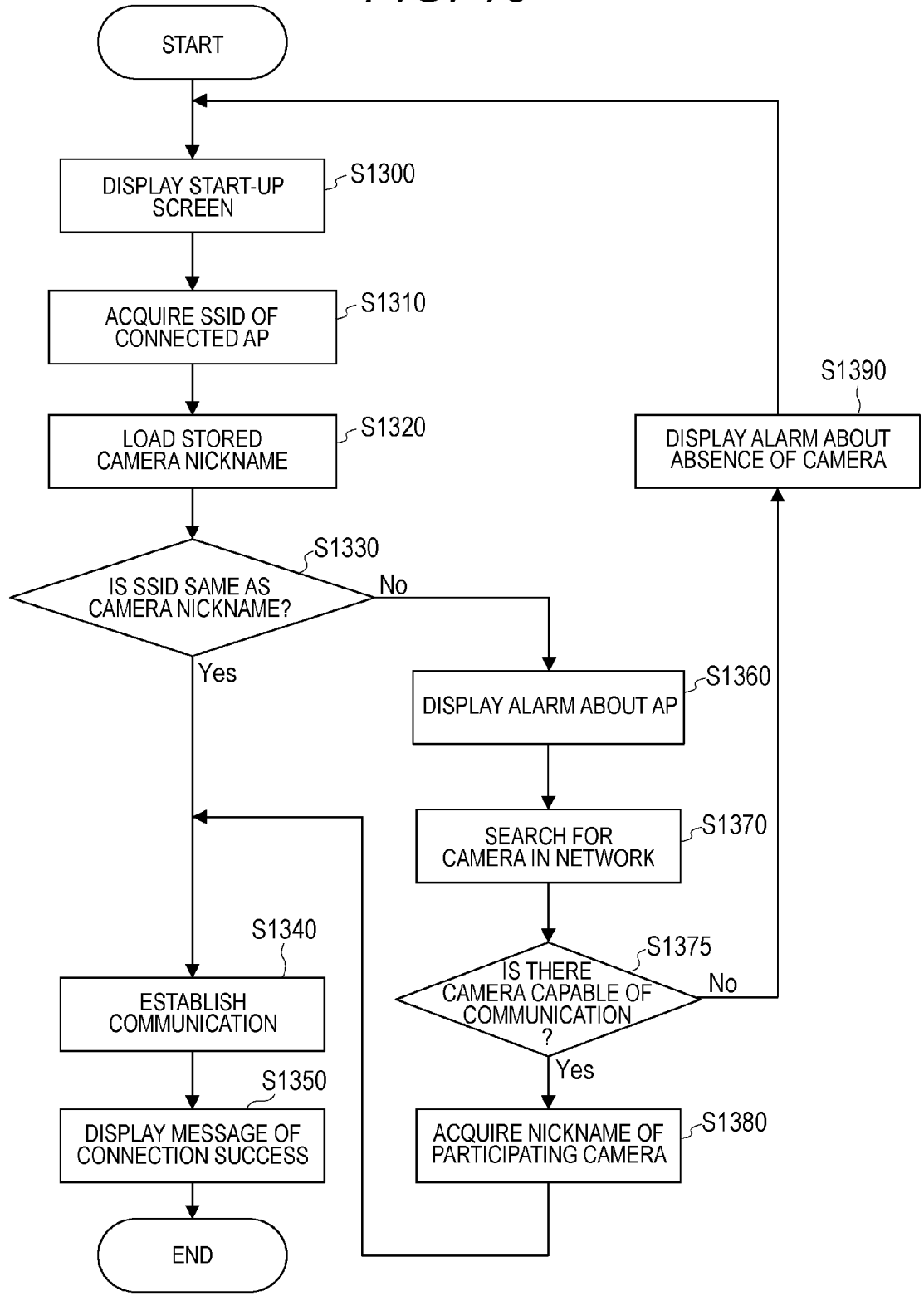
FIG. 13 is a flowchart illustrating a process of the information terminal according to the first embodiment.

The history connection described above will now be described with reference to FIG. 13. The history connection is a function for automatically connecting to an AP to which connection has previously been made without going through the screens in FIGS. 7A and 7B. An operation of the camera communication application in a case of performing the history connection will be described below. The process illustrated in FIG. 13 is performed when the nickname of the digital camera has already been registered at a time of starting the camera communication application.

In step S1300, the controller 201 displays the start-up screen illustrated in FIG. 9A. In parallel with this process, in step S1310, the controller 201 acquires an SSID of a currently connected AP. This is an example of an identifier acquisition process.

In step S1320, the controller 201 loads the nickname of the digital camera 100 saved in the nonvolatile memory 203. This is an example of an identification name data acquisition process.

In step S1330, the controller 201 determines whether the nickname loaded in step S1320 is the same as the SSID acquired in step S1310. When it is determined that the nickname and the SSID are identical, the controller 201 determines that the currently participating network is the network formed by the digital camera 100, and the process proceeds to step S1340.

In step S1340, the controller 201 performs a process (similar to the process in FIG. 8) for establishing communication with the digital camera 100.

Then, when communication with the digital camera 100 is established, the controller 201 displays a message of connection success in step S1350 and terminates the process. In this way, the digital camera 100 and the information terminal 200 may operate in a coordinated fashion.

Meanwhile, when it is determined in step S1330 that the nickname and the SSID are different, the controller 201 determines that the currently participating network is not the network formed by the digital camera 100, and the process proceeds to step S1360.

Figure 14A:
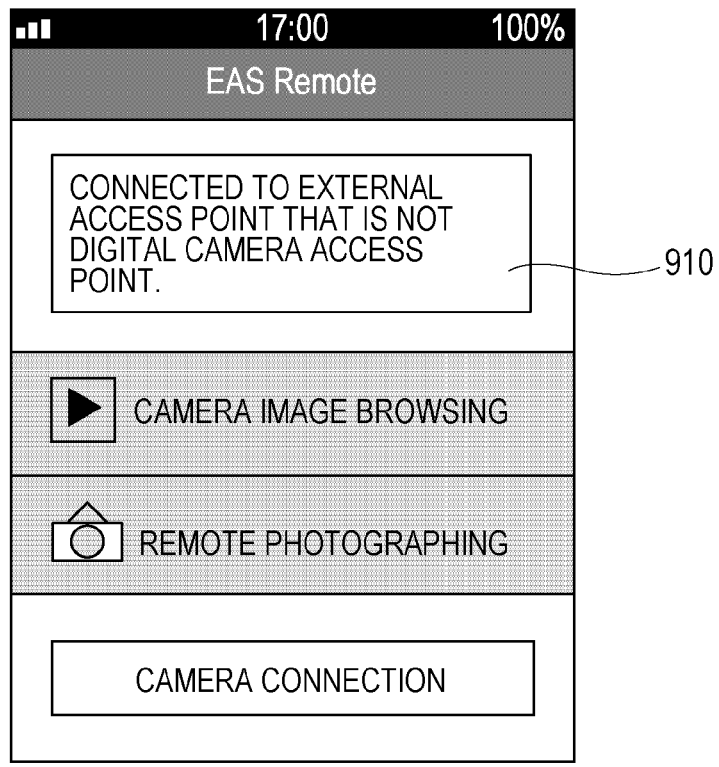
FIGS. 14A and 14B illustrate screens of the information terminal according to the first embodiment.

In step S1360, the controller 201 notifies that the information terminal 200 is not connected to the digital camera 100. In the present embodiment, a screen illustrated in FIG. 14A is displayed on the display unit 206. The screen illustrated in FIG. 14A displays the SSID of the newly connected AP and a message saying that the information terminal 200 is being connected to an AP that is not the camera AP.

In step S1370, the controller 201 searches the network in which the information terminal 200 is currently participating to find out whether the digital camera 100 is participating in the network.

Then, in step S1375, the controller 201 determines whether the digital camera 100 is transmitting a connection request in response to the search. When it is determined that the connection request is transmitted, the process proceeds to step S1380.

In step S1380, the controller 201 requests the digital camera 100 to transmit the nickname and receives the nickname. In this case, it is determined that the digital camera 100 operates in the infrastructure mode and is attempting to establish communication with the information terminal 200 via an external AP. After the nickname is received, the controller 201 performs a process for establishing connection in step S1340 and displays a message of connection success in step S1350.

Figure 14B:
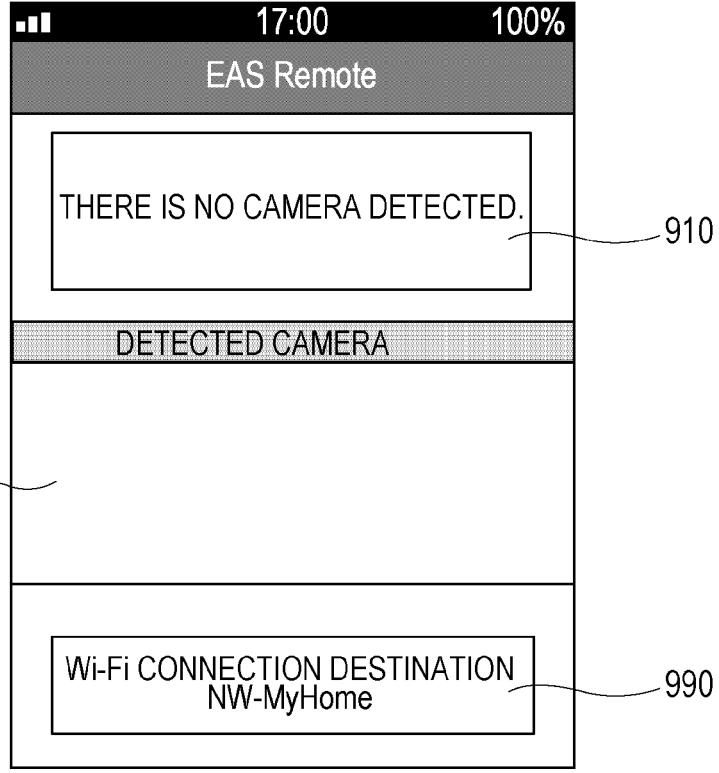

Meanwhile, a case where it is determined in step S1375 that the digital camera 100 is not transmitting the connection request will be described. In this case, the digital camera 100 is quite unlikely to be participating in the same network as the information terminal 200 is. Accordingly, in step S1390, the controller 201 displays an alarm message notifying that there is no operating camera. FIG. 14B illustrates an example of a screen in this case.

The screens illustrated in FIGS. 14A and 14B are displayed for the following reason. The user of the information terminal 200 who communicates with the digital camera 100 operated in the camera AP mode may believe that the information terminal 200 will be connected to the same AP also when connecting the information terminal 200 to the digital camera 100 next time. However, the camera AP of the digital camera 100 is unlikely to always operate, and the information terminal 200 may automatically be connected first to another external AP having a connection history. After automatic connection to the external AP in such a way, even if the digital camera 100 is operated as the camera AP, the information terminal 200 may not find the digital camera 100. Accordingly, although the user operates the digital camera 100 and the information terminal 200 in the same way as last time, a situation may occur in which the information terminal 200 cannot be connected to the digital camera 100.

Therefore, the information terminal 200 in the present embodiment notifies the user that the information terminal 200 is currently participating, to begin with, in a network different from the network formed by the digital camera 100 by displaying the screen as illustrated in FIG. 14A. Then, the information terminal 200 displays the screen illustrated in FIG. 14B to notify that the digital camera 100 is not participating in the current network. Notification according to such a procedure enables the user to easily grasp the reason for communication with the digital camera 100 being unavailable.

Furthermore, in the present embodiment, the SSID of the network in which the information terminal 200 is participating is compared with the already registered nickname to determine whether the information terminal 200 is participating in the camera AP. Alternatively, the information terminal 200 may store an SSID of a network in which the information terminal 200 has most recently participated to display an alarm when the information terminal 200 participates in a network different from the network in which the information terminal 200 participated last time.

(Second Embodiment)

A method for connecting a digital camera 100 to an information terminal 200 according to a second embodiment will now be described with reference to FIG. 15.

In the first embodiment, configuring a network connection setting has been described as a function of an OS of the information terminal 200. In such a case, in order to accomplish a network changeover using a camera communication application, it is necessary to employ a method such as prompting a user to change the network.

Alternatively, the OS of the information terminal 200 may allow the camera communication application to configure the network setting. In this case, the camera communication application may have a function to change the network in which the information terminal 200 participates. A process using the information terminal 200 installed with such an OS will be described in the present embodiment.

Figure 15:
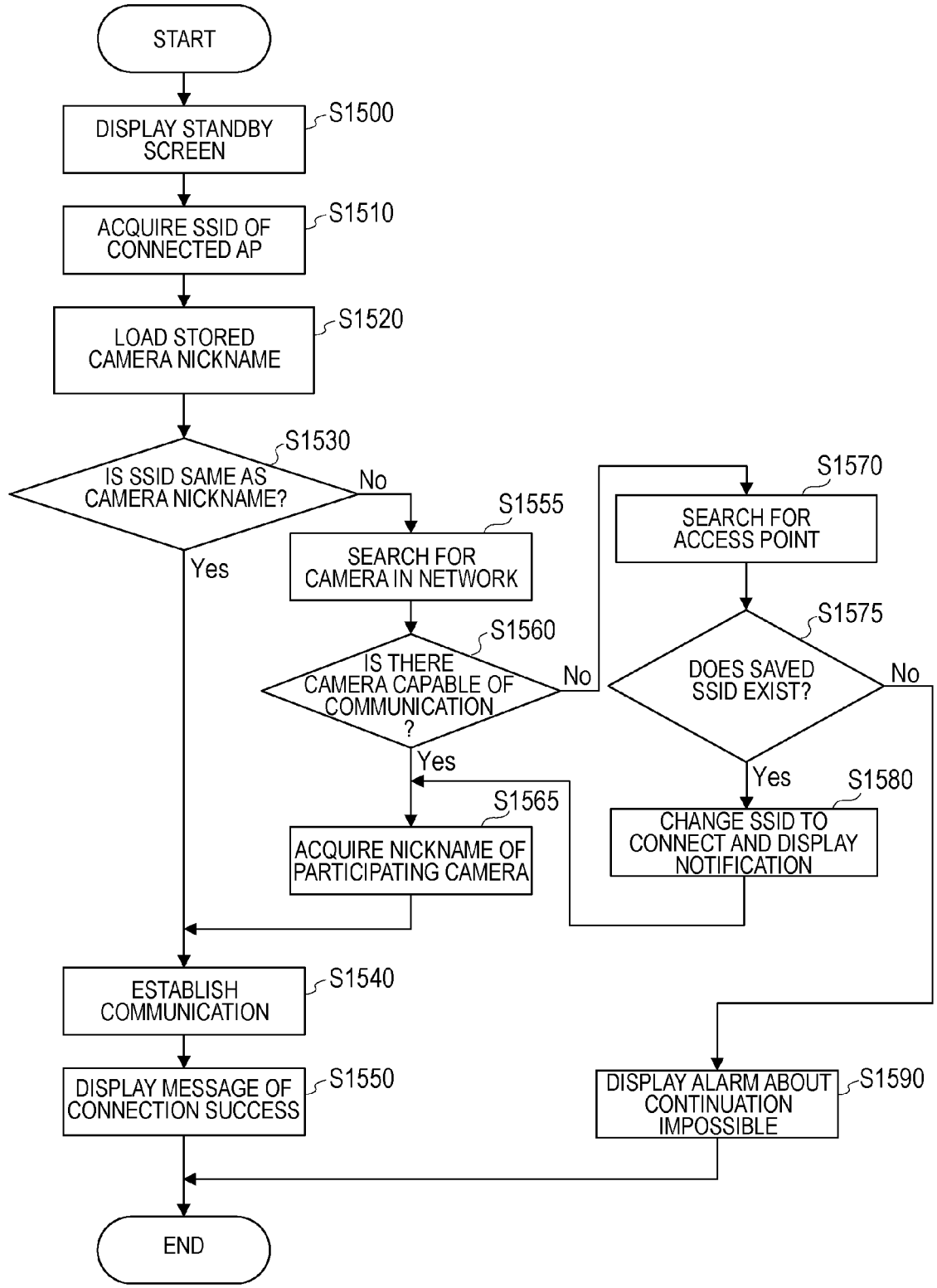
FIG. 15 is a flowchart illustrating a process of the information terminal according to a second embodiment.

FIG. 15 is a flowchart illustrating a process of the information terminal 200 in the present embodiment after participation in the network. Since this flowchart has many parts common to FIG. 13, a description of the common parts will be omitted, and parts unique to the present embodiment will be described in detail.

First, since the process from step S1500 to step S1550 is similar to that from step S1300 to step S1350 in FIG. 13, the description thereof will be omitted. A case where it is determined in step S1530 that an SSID differs from a nickname will be described below. In this case, the process proceeds to step S1555.

Since the process in steps S1555, S1560, and S1565 is similar to that in steps S1370, S1375, and S1380 in FIG. 13, the description thereof will be omitted. A case where a digital camera capable of communication is not detected in step S1560 will be described below.

When a digital camera is not detected, the process proceeds to step S1570, in which the controller 201 searches for a nearby AP. In the present embodiment, since the camera communication application may perform network-related control, the process in this step may be performed under control of the camera communication application.

In step S1575, the controller 201 determines whether SSIDs of APs detected by the search include an SSID identical to a nickname of a digital camera stored in a working memory 204. When it is determined that the identical SSID is included, the process proceeds to step S1580. When it is determined that the identical SSID is not included, the process proceeds to step S1590, in which a message is displayed saying that there is no digital camera present in this environment, and the process ends.

Figure 16:
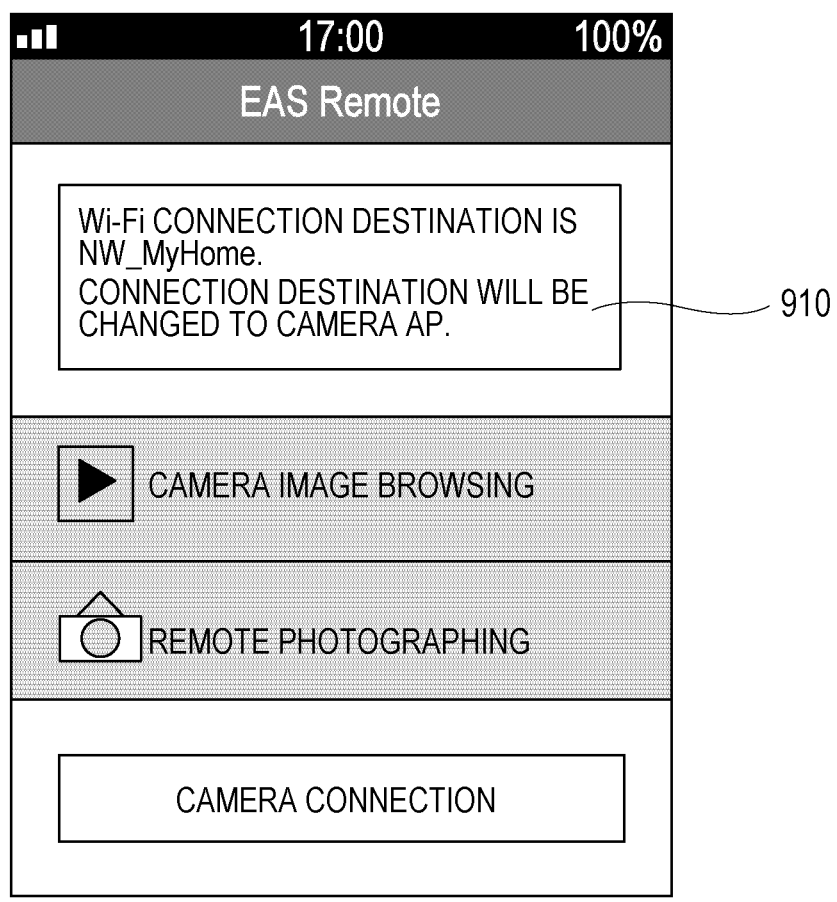
FIG. 16 illustrates a screen of the information terminal according to the second embodiment.

Meanwhile, in step S1580, the controller 201 makes a notification that a network to participate in will be changed to the detected camera AP of the digital camera, and changes the network. FIG. 16 illustrates an example of the notification screen.

When the AP change is completed, the process goes through step S1565, which is a nickname acquisition process, and proceeds to step S1540, in which the controller 201 establishes connection to the specified camera AP.

In this way, even if an operator has already connected the information terminal 200 to another AP, it will be possible to change the connection to the network formed by the camera AP as long as the digital camera 100 has started up.
(Other Embodiments)

The above-described embodiments are not seen to be limiting. Various modifications and changes may be made within the spirit and scope of the present disclosure.

For example, although the nickname of the digital camera 100 is used as the SSID in the above embodiments, it may not be required to make the nickname exactly coincide with the SSID. For example, part or all of the nickname may be included in the SSID, or a value into which the nickname is converted by a predetermined rule may be used as the SSID. That is, the SSID and the nickname may have any configuration that enables the information terminal 200 to recognize a relationship therebetween.

Other Embodiments

Additional embodiments can also be realized by a computer of a system or apparatus that reads out and executes computer executable instructions recorded on a storage medium (e.g., computer-readable storage medium) to perform the functions of one or more of the above-described embodiment(s), and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that these embodiments are not seen to be limiting. The scope of the following claims is to be accorded the broadest interpretation so as to encompass all such modifications and equivalent structures and functions.

This application claims the benefit of Japanese Patent Application No. 2012-203020, filed Sep. 14, 2012, which is hereby incorporated by reference herein in its entirety.

What is claimed is:

1. A communication apparatus, comprising:
a communication interface configured to connect to a network formed by an access point and allow data communication via the network;
a processor configured to:
establish communication with an external device via the communication interface and the network;
receive a device ID from the external device via the communication interface and the network;
compare a received network ID of the network connected via the communication interface with the device ID received by the processor;
determine whether the external device is operating as the access point based on a result of the comparison: and
provide, to a user via a display, a predetermined notification identifying a type of communication mode established between the communication apparatus and the external device based on the determination.

2. The communication apparatus of claim 1, further comprising:
a storage unit configured to store a history of the connected network, wherein the processor is further configured to determine whether the network connected via the communication interface satisfies a predetermined condition based on the history stored by the storage unit and the network ID of the network connected via the communication interface.

3. The communication apparatus of claim 2, wherein the processor is further configured to provide the predetermined notification when it is determined that the external device having established communication via the communication interface is not operating as the access point and when it is determined that the network connected via the communication interface satisfies the predetermined condition.

4. The communication apparatus of claim 3, wherein the predetermined notification indicates that the network connected via the communication interface is not the network formed by the external device having established communication via the communication interface.

5. The communication apparatus of claim 3, wherein the predetermined notification indicates that the network to connect to via the communication interface is changed.

6. The communication apparatus of claim 2, wherein the processor changes a network to connect to via the communication interface when the processor determines that the external device having established communication via the communication interface is not operating as the access point, and when the processor determines that the network connected via the communication interface satisfies the predetermined condition.

7. The communication apparatus of claim 2, wherein the communication interface allows automatic connection to any one of nearby access points based on the history stored in the storage unit.

8. The communication apparatus of claim 1, wherein the network ID is determined based on the device ID.

9. The communication apparatus of claim 1, wherein the network ID is alphanumeric and includes part of the device ID.

10. The communication apparatus of claim 1, wherein the device ID is determined based on a user operation.

11. The communication apparatus of claim 1, wherein the communication apparatus is a mobile phone.

12. The communication apparatus of claim 1, wherein the communication apparatus is a tablet device having a touch panel.

13. The communication apparatus of claim 1, wherein the external device includes an image-capturing device.

14. The communication apparatus of claim 1, wherein the external device is a digital camera.

15. A method for controlling a communication apparatus, the method comprising:
- connecting, via a communication interface, to a network formed by an access point and allowing data communication;
- establishing communication with an external device via the communication interface and the connected network;
- receiving a device ID from the external device via the communication interface and the network;
- comparing a received network ID of the connected network via the communication interface with the received device ID;
- determining whether the external device is operating as the access point based on a result of the comparison; and
- displaying a predetermined notification identifying a type of communication mode established between the communication apparatus and the external device based on the determination.

16. A non-transitory computer readable storage medium storing computer-executable instructions that cause a computer to execute a control method for controlling the operation of a communication apparatus, the method comprising:
- connecting, via a communication interface, to a network formed by an access point and allowing data communication:
- establishing communication with an external device via the communication interface and the connected network;
- receiving a device ID from the external device via the communication interface and the network;
- comparing a received network ID of the connected network via the communication interface with the received device ID;
- determining whether the external device is operating as the access point based on a result of the comparison; and
- displaying a predetermined notification identifying a type of communication mode established between the communication apparatus and the external device based on the determination.

* * * * *